Jan. 2, 1951  H. HAMMOND  2,536,742
APPARATUS FOR TREATING PERLITE ORE
Filed March 26, 1949
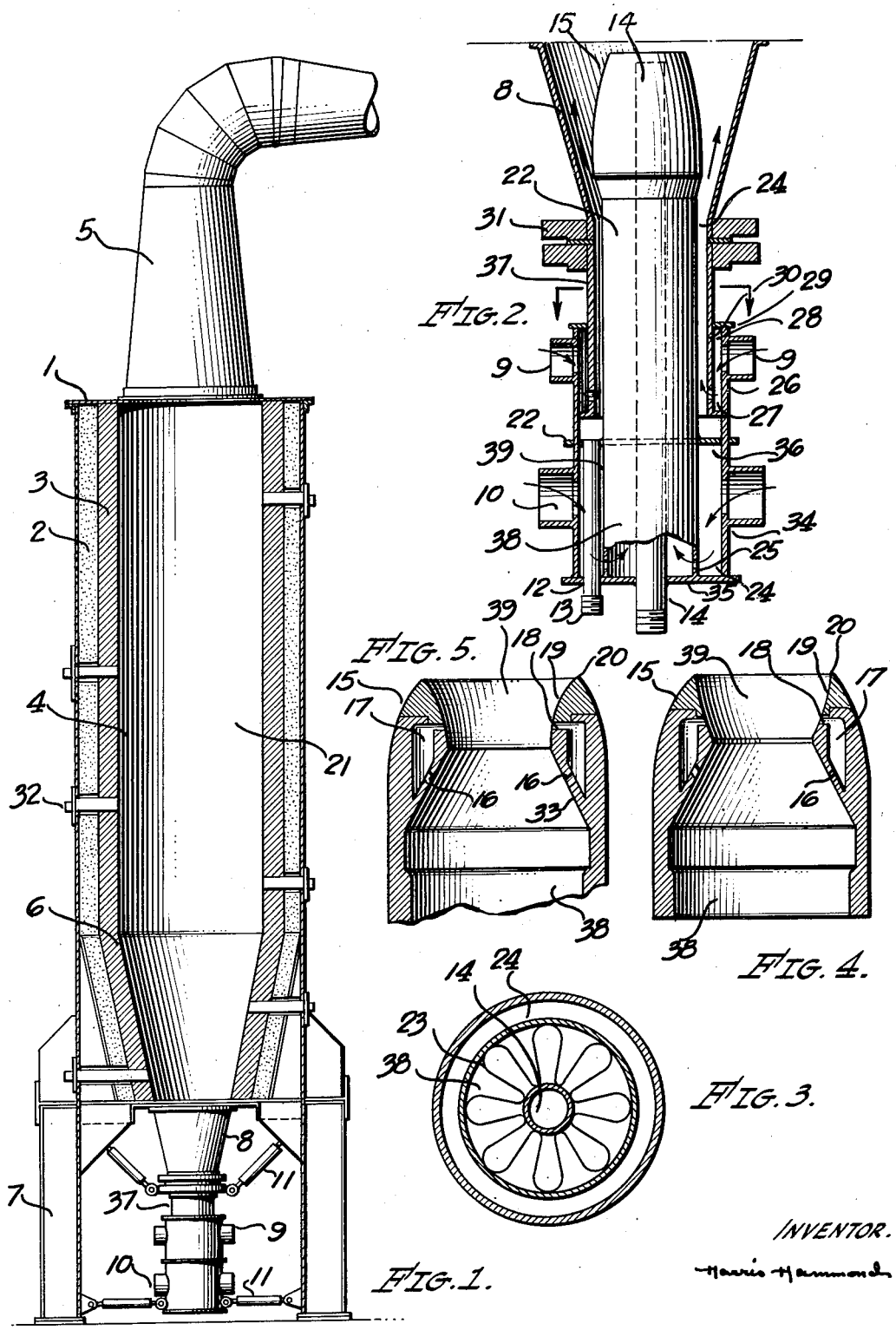
INVENTOR.
Harris Hammond Patented Jan. 2, 1951

2,536,742

UNITED STATES PATENT OFFICE 2,536,742

APPARATUS FOR TREATING PERLITE ORE

Harris Hammond, Los Angeles, Calif.

Application March 26, 1949, Serial No. 83,597

9 Claims. (Cl. 263—21)

This invention relates to a process and apparatus for the production of insulating material by thermally treating mineral Perlite under conditions of temperature and time which converts the Perlite into a fluffy, light mass.

Perlite or Pearlstone is a glass volcanic rock which, when hammered, breaks into small rounded masses often of a pearly lustre, the reason being the many small cracks traversing its glassy substance. These cracks mostly take a circular course, and often occur in groups, one within another; they bound the little spheres into which the rock falls when it is struck, and the concentric fissures reflecting light from enclosed films of air are the cause of the pearly lustre. Longer straight cracks run across the sections separating areas in which the circular fissures preponderate. By decomposition the fissures may be occupied by secondary minerals; the glass itself often undergoes change along the cracks by becoming finely crystalline or devitrified, dull in appearance and slightly opaque in section. In polarized light the perlitic glass is usually isotropic, but sometimes the interior of some of the spheres has a slight double refraction, apparently due to strain. Many rocks which are cryptocrystalline or felsitic, and not glassy, have perfect perlitic structure, and it seems probable that these were originally vitreous obsidians or pitchstones and have in time been devitrified to a finely crystalline state. Occasionally in olivine and quartz rounded cracks not unlike perlitic structure may be observed.

Many perlitic rocks contain well-developed crystals of quartz, felspar, augite or magnetite, etc., and in the fine glassy base minute crystallites often abound. Some have the resinous lustre and the high percentages of combined water which distinguish the pitchstones; others are bright and fresh obsidians, and nearly all the older examples are dull, cryptocrystalline felsites. According to their chemical compositions they range from very acid rhyolites to trachytes and andesites, and the dark basaltic glasses or tachylytes are sometimes highly perlitic. It is probable that most perlites are of intrusive origin, as indicated by the general absence of steam cavities, but some perlitic Hungarian rhyolites are believed to be lavas. Rocks of this kind are found in Meissen, Saxony, as dikes of greenish and brownish pitchstone. Other examples are furnished by the Tertiary igneous rocks of Hungary (Tokay, etc.), the Euganean Hills (Italy) and Ponza Island (Mediterranean).

In mineralogical collections rounded nodules of brown glass varying from the size of a pea to that of an orange may often be seen labelled Marekanite. They are found at Okhotsk, Siberia, in association with a large mass of perlitic obsidian, and are the more coherent portions of a perlite. They are subject to considerable internal strain, and when struck with a hammer or sliced with a lapidary's saw they often burst into fragments—as do "Prince Rupert's drops." In their natural conditions the marekanite spheres are doubly refracting, but when they have been heated and very slowly cooled they lose this property and no longer exhibit any tendency to sudden disintegration.

In Great Britain Tertiary vitreous rocks are not common, but the pitchstone which forms the Scuir of Eigg is a dark andesitic porphyry with perlitic structure in its glassy matrix. A better example, however, is provided by a perlitic dacitic pitchstone porphyry that occurs near the Tay Bridge; the tachylytic basalt dikes of Mull are occasionally highly perlitic.

By grinding the mineral Perlite, described above, and passing it through a mesh of 6 to 200 and heating this ground material in a zone of combustion gas for a period of about 1 to 60 seconds at a temperature between 1400° F. and 2200° F. this dark glassy vitreous material is converted over to a solid which is substantially white and weighs about 4½ pounds per cubic foot. The operation of converting the dark heavy mineral Perlite into this light solid is termed herein as "popping." The popped Perlite is highly cellular, has a low specific gravity, is highly resistant to heat, possesses a high insulating value against heat or cold and, therefore, may be utilized for a number of novel processes hereinbefore unknown.

The finished product consists essentially of oxides and complex silicates. The actual reaction resulting in the production of the finished product takes places between 1800° F. to 1900° F. and is sufficiently violent to explode completely the particle. This reaction requires only about 1 to 1½ seconds and in no event over 5 seconds.

I have discovered a novel process as well as a novel apparatus for the conversion of the mineral Perlite into the light fluffy form hereinabove described.

The apparatus which I employ to convert the glassy Perlite into the popped form, or light form, is shown in Figures 1 to 5, inclusive.

Figure 1 is a view of the general arrangement of the apparatus utilized for the exfoliation of the ore. This figure shows the furnace assembly, the burner assembly and the general form of exit pipe used for passing the exfoliated ore and hot combustion gases to a separating device, such as a cyclone, for the separation of the solids from the gases. Any convenional type of cyclone is suitable for the separation of the exfoliated ore from the hot combustion gases, therefore, this part of the apparatus is not shown in the figure.

Figure 2 shows a detailed arrangement of the burner assembly.

Figure 3 is a sectional view of Figure 2 and Figures 4 and 5 show cross sections of the burner tip employed in the apparatus.

Referring more specifically to Figure 1, 1 represents a metal shell which forms the housing for the furnace. Inside of the metal shell 1 some suitable ceramic material 2 is utilized forming an inner lining with the metal shell. Inside of the ceramic lining a brick wall 3 forms the inner part of the furnace. This wall is very carefully laid so that the surface along edge 4 is free from any indentations or protrusions which would tend to collect solid material exfoliated within the space 21. The lower part of the furnace is in the shape of a cone 6 which slopes downward and inwardly until it becomes flush with the burner assembly 8. 7 represents a suitable form of a base. The burner assembly is held to this base by means of the turnbuckles 11 which can be adjusted so that perfect alignment is obtained between the burner and the inner walls of the furnace. This alignment is necessary in order to prevent any direct impingement of the flame from the burner tip against the inner wall of the cone 6 or the surface 4 of the main body of the furnace. Pipe 5 attached to the top of this furnace is utilized, as previously described, to remove the exfoliated ore and gases to some suitable separatory system for solids and gases, not shown. As explained above, the separatory system can be any standard form of cyclone normally used for separating solids from gases. Along the outer wall is shown a series of peep holes 32. Each of these holes is provided with a suitable plug which can be removed by a pair of tongs. These openings permit inspection of the furnace during its operation.

Figure 2 shows the assembly of the burner. The cone 8 which fits flush with the inner wall of cone 6 contains the main burner 22. At the lower end of the cone 8 suitable lugs 31 are provided for attaching the turnbuckles 11. The walls 37 from these lugs downward are parallel to the wall of the main burner 22. The main burner 22 is provided with a tip 15 which is shown in detail in Figures 4 and 5. Through the center of the main burner 22 an ore pipe 14 is provided. This pipe is for the introduction of the ore into the furnace space 21, to be exfoliated. Opening 9 shown in Figures 1 and 2 is for the purpose of introducing a cool gas into the space 24. This gas passes from opening 9 into the annular chamber 28 formed by walls 26, 29 and 30 and the main burner wall 39. The gas passes through 9 into the chamber 28 and thence through a series of small openings 27 into the space 24. A combustible mixture of hydrocarbon gas and air in the proportion of about 1 part of hydrocarbon gas (methane) to 10 to 12 parts of air is introduced through pipe 10. This gas flows into the annular chamber 24 formed by the walls 34, 35, 36 and the burner wall and from this chamber it then flows through a series of small openings 25 in the burner wall 39, into the space 38 from whence it proceeds upwardly into burner tip 15. The tube 12, shown in Figure 2, provided with the cap 13 is for the purpose of removing any solid material which collects in the space 24. By removing the cap 13 this solid material can be withdrawn after which the cap 13 is replaced.

It will be noted from the assembly that the only gases which are admitted into the furnace must enter through openings 9, 10 and pipe 14. Atmospheric air is otherwise excluded.

Referring to Figures 4 and 5, the combustible gas coming up through the duct or space 38 passes a series of small openings 26 which permit a portion of the gas to enter chamber 17. This combustible material then comes out into the flame portion of the burner at opening 16 where a small pilot flame persists. The main portion of the combustible gas, however, passes through the throat 39 surrounding the ore pipe 13 and starts burning from a point immediately above the opening 18. The pilot flame at 16 prevents the flame from moving away from the tip of the burner.

It will be noted by referring to Figures 4 and 5 that the outer surfaces 15 and the inner surfaces 19 are so constructed that any solid material impinging upon these surfaces will drop off due to the fact that the pitch of these surfaces is greater than the angle of repose of any solid material. It will also be noted that the upper edge or leading edge of the tip 20 is brought to a sharp point so that solid material cannot reside at this position. Furthermore, the outer surface 15 of Figures 4 and 5 are highly polished and smooth and have no indentations or protrusions. Furthermore, if reference is made to surface 19 it will be noted that as this surface extends over the opening 18 there are no ledges formed either by the upper portion of the opening 18 or the lower portion of the opening 18 with the surface 19. This is important in preventing solid material from becoming lodged at this point.

Figure 3 represents a cross section of the burner assembly showing the ore pipe 4, the main gas space 38 of burner 22 and the auxiliary air or gas space 24. The vanes 23 are for the purpose of preventing swirling of the gas as it enters space 38. These are sometimes referred to as "straightening" vanes.

In carrying out the operation of expanding Perlite ore in my apparatus, I proceed as follows: The ore is first ground to mesh size somewhere between 6 to 200. The combustible mixture of gas and air is introduced into pipe 10 and passes through the openings 25 to the tip 15 where it is ignited and forms a conical flame around this tip. The ore is introduced into pipe 14 and is suspended in this passageway in a stream of gas comprising air and combustible gas and this material then flows upwardly through the pipe 14 and through the flame formed by the burning gas at the tip 15. It has been found essential to add a combustible gas into the ore pipe 14 along with the ore suspending air in order to obtain the necessary heat in the flame to produce a satisfactory grade of exfoliated ore. If the ore is simply fed into the flame through pipe 14 by means of a stream of air the chilling effect of this air in the ore is sufficient to cause a substantial portion of the ore to be improperly exfoliated by reason of the fact that the central portion of the flame will be lowered to a temperature not sufficiently high to produce properly exfoliated ore. This is overcome by adding sufficient gas through pipe 14 along with the ore so that the gases passing from the pipe 14 along with the ore in the flame burn.

As explained above, it will be noted from the drawing that the bottom of the furnace is completely closed to prevent air from entering any part of the furnace except through the air pipe 14, the fuel feed pipe 10 and the auxiliary air pipe 9.

By preventing air from being inducted into the bottom of the furnace a satisfactory control is maintained with respect to the flame pattern. This cannot be accomplished where the bottom of the furnace is open and varying amounts of inducted air are drawn into the furnace. The inducted air not being constant in quantity causes a surge in the flame. This causes direct flame impingement on the inner wall of the furnace thereby creating hot spots upon which the hot exfoliated ore forms a clinker.

By closing the bottom of the furnace a positive control is maintained upon the air introduced into the bottom of the furnace thereby preventing the formation of clinker on the inner wall of the furnace. Actually, by preventing air from being inducted into the furnace a larger amount of ore can be exfoliated than can be accomplished where air is permitted to be inducted into the furnace at the bottom.

The important feature of my invention, as pointed out above, is the use of a furnace design which permits the ore to be fed into the center of the flame, surrounds the flame with a film or blanket of auxiliary cooling air to prevent formation of clinker on the furnace wall and is so constructed that no air is permitted to be inducted into the burner end of the furnace which would disturb the flame pattern.

As an example of the method of carrying out my invention, Perlite ore ground to a mesh size of about 50 is introduced into the furnace through line 14 together with an air-gas mixture containing air and gas in the ratio of about 12 parts of air to 1 part of gas. The combustible gas is introduced into the burner 22 through line 10. The combustible gas introduced through 10 begins burning near the leading edge of the tip 15 and is held there by the pilot flame formed by the opening 18. The gas and air mixture contained in the ore pipe 14 also burns in the main flame body. The temperature in the space 21 ranging from about 1800° F. to 2200° F., depending upon the size of the ore feed to the furnace and the degree of exfoliation desired. Auxiliary air is introduced via line 9 and passes via the openings 27 into the space 24 upwardly along the inner wall of the furnace thereby preventing any clinkering of the exfoliated ore on the inner wall 4 of the furnace. The ratio of combustible gas to air in pipe 14 can be the same as the combustible air-gas ratio of the material fed into pipe 10. However, in some cases it has been found that a richer mixture can be fed into pipe 14 than can be fed into pipe 10. In other words, the ratio of air to gas in the lift line of ore pipe 14 can be in the order of 8 to 1 or, in some cases, as low as 4 to 1. Good results have also been obtained where the air-gas ratio in the lift line 14 is in the order of 20 to 1. In other words, the spread in this air-gas mixture in the lift line 14 can be anywhere from 4 to 1 to 20 to 1.

I claim:

1. A burner comprising a central tube for supplying a mixture of gas and solid material, a duct surrounding said tube, a chamber in communication with said duct by means of a plurality of small openings, means for supplying a combustible gas mixture to said chamber, an annular space surrounding said duct, a chamber in communication with said annular space by means of a plurality of small passageways and means for supplying a gas to said last mentioned chamber.

2. A burner comprising a central tube for supplying gas and solid material, a duct surrounding said tube, a chamber surrounding said duct and in communication therewith by means of a plurality of uniformly distributed passageways, an annular space surrounding said duct, a chamber surrounding said annular space and in communication therewith by means of a plurality of uniformly distributed passageways.

3. A burner comprising a central tube for supplying a mixture of gas and solid material, a duct surrounding said tube, a chamber surrounding a portion of said duct and separated therefrom by a wall, a plurality of uniformly distributed small openings in said wall, means for supplying a combustible gas to said chamber, an annular space surrounding another portion of said duct, a chamber surrounding said annular space and separated therefrom by means of a wall, a plurality of evenly spaced small openings in said last mentioned wall and means for supplying a gas to said last mentioned chamber.

4. A burner comprising a central passageway for gas and solid material, a duct surrounding said passageway, a chamber surrounding a portion of said duct and in communication therewith by means of a plurality of small openings, means for supplying a combustible mixture to said chamber, an annular space surrounding another portion of said duct, a chamber surrounding said annular space and in communication with said duct by means of a plurality of small openings, a burner tip mounted on the upper terminus of the outer wall of said duct, said tip having all of its surface inclined at an angle greater than the angle of repose for solid material introduced through said central passageway.

5. A burner comprising a central passageway for gas and solid material, a duct surrounding said passageway, a chamber surrounding a portion of said duct and in communication therewith by means of a plurality of small openings, means for supplying a combustible mixture to said chamber, an annular space surrounding another portion of said duct, a chamber surrounding said annular space and in communication with said duct by means of a plurality of small openings, a burner tip mounted on the terminus of the outer wall of said duct, said tip having all of its surface smooth and inclined at an angle greater than the angle of repose for solid material introduced through said central passageway.

6. A burner comprising a central passageway for gas and solid material, a duct surrounding said passageway, a chamber surrounding a portion of said duct and in communication therewith by means of a plurality of small openings, means for supplying a combustible mixture to said chamber, an annular space surrounding another portion of said duct, a chamber surrounding said annular space and in communication with said duct by means of a plurality of small openings, means for preventing swirling of gas in said duct, a burner tip mounted on the terminus of said duct said tip having all of its surfaces inclined at an angle greater than the angle of repose for solid particles contacting said surface.

7. A burner which comprises an elongated central tube, an elongated duct coaxial with and of substantially the same length as said tube, a first chamber surrounding one portion of said duct, a plurality of uniformly spaced holes communicating said chamber with said duct, an inlet conduit opening into said chamber, an enclosed annular space surrounding the remaining portion of said duct, a second chamber surrounding a portion of said annular space, a plurality of uniformly spaced holes communicating said second chamber with said annular space, an inlet conduit opening into said second chamber, a plurality of longitudinal straightening vanes within said duct, a burner tip integral with the discharge end of said duct and provided with a throat of restricted cross-sectional area, a plurality of passageways by-passing said throat through the wall of said burner tip, the inner and outer surfaces of said burner tip being finished and having a slope greater than the angle of repose of granular solids passing through said central tube.

8. An ore treating furnace which comprises a cylindrical shell portion, a conical shell portion flush therewith at one end of said shell portion and having a smooth inner wall surface, an outlet conduit for a suspension of treated ore in gaseous combustion products and attached to the other end of said shell portion, a combination burner and ore inlet attached to and opening into said conical portion, said burner consisting of an elongated central tube coaxial with said cylindrical and conical shell portions, an elongated duct coaxial and substantially coextensive with said central tube and surrounding the same, a first annular chamber coaxial with and surrounding a portion of said duct, an inlet conduit for gases opening into said first chamber, a plurality of small uniformly spaced holes peripherally spaced in the wall common to said duct and said first chamber, an enclosed annular space coaxial with and surrounding the remaining portion of said duct, a second annular chamber coaxial with and surrounding part of said annular space, an inlet conduit for gases opening into said second chamber, a plurality of uniformly spaced holes in the wall common to said annular space and said second chamber, a plurality of longitudinal gas flow straightening vanes within said duct, a burner tip attached to the outer wall of said duct, said burner tip and a portion of said central tube extending into said conical shell portion, and means for preventing the induction of any air into said furnace except through said inlet conduits.

9. A furnace according to claim 8 wherein said cylindrical shell portion is disposed vertically with said conical shell section and said burner at the bottom firing upwardly.

HARRIS HAMMOND.

REFERENCES CITED

The following references are of record in the file of this patent:

UNITED STATES PATENTS

| Number | Name | Date |
|---|---|---|
| 1,073,462 | Banes | Sept. 16, 1913 |
| 1,178,551 | Stolle et al. | Apr. 11, 1916 |
| 1,513,622 | Manning | Oct. 28, 1924 |
| 1,938,651 | McKee | Dec. 12, 1933 |
| 2,167,183 | Naab et al. | July 25, 1939 |
| 2,286,191 | Aitchinson | June 16, 1942 |
| 2,421,902 | Neuschotz | June 10, 1947 |
| 2,431,884 | Neuschotz | Dec. 2, 1947 |
| 2,502,947 | Hess | Apr. 4, 1950 |